(12) United States Patent
Bodlaender

(10) Patent No.: US 11,265,154 B2
(45) Date of Patent: Mar. 1, 2022

(54) NETWORK DEVICE AND TRUSTED THIRD PARTY DEVICE

(71) Applicant: KONINKLIJKE PHILIPS N.V., Eindhoven (NL)

(72) Inventor: Maarten Peter Bodlaender, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 235 days.

(21) Appl. No.: 16/475,386

(22) PCT Filed: Jan. 2, 2018

(86) PCT No.: PCT/EP2018/050033
§ 371 (c)(1),
(2) Date: Jul. 2, 2019

(87) PCT Pub. No.: WO2018/127479
PCT Pub. Date: Jul. 12, 2018

(65) Prior Publication Data
US 2019/0349189 A1   Nov. 14, 2019

(30) Foreign Application Priority Data
Jan. 5, 2017   (EP) .................................. 17150389

(51) Int. Cl.
*H04L 9/08*   (2006.01)
*H04L 9/30*   (2006.01)
(Continued)

(52) U.S. Cl.
CPC ............ *H04L 9/083* (2013.01); *H04L 9/0822* (2013.01); *H04L 9/0847* (2013.01);
(Continued)

(58) Field of Classification Search
CPC ..... H04L 9/083; H04L 9/0822; H04L 9/0847; H04L 9/3073; H04L 9/3242;
(Continued)

(56) References Cited

U.S. PATENT DOCUMENTS 7,239,701 B1 *  7/2007  Ogishi .................. H04L 9/3013
                                                            380/28
8,560,849 B2 * 10/2013  Machani ............... H04L 9/0637
                                                            713/168
(Continued)

FOREIGN PATENT DOCUMENTS

DE     102012209408 A   12/2013
WO       2011100331 A1   8/2011

OTHER PUBLICATIONS

Jinyuan Sun, et al., An Identity-Based Security System for User Privacy in Vehicular Ad Hoc Networks, IEEE Transactions on Parallel and Distributed Systems, vol. 21, No. 9, Sep. 2010 (Year: 2010).*

(Continued)

*Primary Examiner* — Noura Zoubair
*Assistant Examiner* — Mahabub S Ahmed

(57) ABSTRACT

A first network node (100; 200) is configured to, —compute a first shared key (245) to protect confidentiality from the first identity of the second network node and the local key material to protect confidentiality of the first network node, —compute a second shared key (246) to protect integrity from the second identity of the second network node and the local key material to protect integrity of the first network node, —encrypt a message using the first shared key, and —compute a first message authentication code over the message using the second shared key.

19 Claims, 6 Drawing Sheets

(51) Int. Cl.
*H04L 9/32* (2006.01)
*H04L 29/06* (2006.01)

(52) U.S. Cl.
CPC .......... *H04L 9/3073* (2013.01); *H04L 9/3242* (2013.01); *H04L 63/12* (2013.01)

(58) Field of Classification Search
CPC ....... H04L 9/0838; H04L 9/0866; H04L 9/08; H04L 9/30; H04L 9/32; H04L 63/12
USPC .......................................................... 380/282
See application file for complete search history.

(56) References Cited

U.S. PATENT DOCUMENTS

| | | | | |
|---|---|---|---|---|
| 9,065,637 | B2* | 6/2015 | Spector | H04L 9/085 |
| 10,970,398 | B2* | 4/2021 | Takemori | H04W 4/44 |
| 2003/0026433 | A1* | 2/2003 | Matt | H04L 9/0844 |
| | | | | 380/278 |
| 2005/0154873 | A1* | 7/2005 | Cam-Winget | H04L 63/0435 |
| | | | | 713/150 |
| 2006/0179478 | A1* | 8/2006 | Han | H04L 9/3226 |
| | | | | 726/5 |
| 2006/0212928 | A1* | 9/2006 | Maino | H04L 9/0841 |
| | | | | 726/4 |
| 2009/0019284 | A1* | 1/2009 | Cho | H04L 9/3249 |
| | | | | 713/170 |
| 2010/0199094 | A1* | 8/2010 | Ho | H04L 63/061 |
| | | | | 713/171 |
| 2011/0167273 | A1* | 7/2011 | Maas | H04L 9/0838 |
| | | | | 713/171 |
| 2011/0206201 | A1* | 8/2011 | Garcia Morchon | H04L 9/0838 |
| | | | | 380/44 |
| 2011/0206206 | A1* | 8/2011 | Blom | H04L 63/06 |
| | | | | 380/279 |
| 2012/0159153 | A1* | 6/2012 | Shim | H04L 9/3073 |
| | | | | 713/155 |
| 2013/0097421 | A1* | 4/2013 | Lim | G06F 21/602 |
| | | | | 713/167 |
| 2013/0166686 | A1* | 6/2013 | Omar | H04L 9/083 |
| | | | | 709/217 |
| 2014/0096253 | A1* | 4/2014 | Garcia Morchon | H04L 63/1458 |
| | | | | 726/23 |
| 2014/0122888 | A1* | 5/2014 | Yoon | H04L 63/083 |
| | | | | 713/171 |
| 2015/0381365 | A1* | 12/2015 | Garcia Morchon | H04L 9/0816 |
| | | | | 380/30 |
| 2016/0043870 | A1* | 2/2016 | Avanzi | H04L 9/0861 |
| | | | | 713/176 |
| 2016/0254909 | A1* | 9/2016 | Garcia Morchon | H04W 12/041 |
| | | | | 380/46 |
| 2017/0272945 | A1* | 9/2017 | Link, II | H04L 9/3242 |
| 2017/0366343 | A1* | 12/2017 | Wifvesson | H04W 12/0431 |
| 2018/0159833 | A1* | 6/2018 | Zhang | H04L 29/06 |
| 2018/0167216 | A1* | 6/2018 | Walrant | H04W 12/069 |
| 2019/0141524 | A1* | 5/2019 | Wang | H04W 12/06 |
| 2019/0141533 | A1* | 5/2019 | Kang | H04L 9/32 |
| 2019/0208417 | A1* | 7/2019 | Kang | H04W 80/02 |
| 2019/0238325 | A1* | 8/2019 | Takemori | H04L 9/3271 |
| 2020/0296108 | A1* | 9/2020 | Roth | H04L 63/06 |
| 2021/0044427 | A1* | 2/2021 | Wang | H04L 9/085 |
| 2021/0119989 | A1* | 4/2021 | Lim | H04L 63/0471 |

OTHER PUBLICATIONS

Arce: Lightweight Security Architecture for the Internet of Things Based on HIMMO; Universidad De Cantabria, Jul. 2015, 57 Pages.
Blundo et al: Perfectly-Secure Key Distribution for Dynamic Conferences; Advances in Cryptology—CRYPTO '92, LNCS 740, pp. 471-486, 1993, pp. 471-486.
Garcia-Morchon et al: "A Comprehensive and Lightweight Security Architecture to Secure the IoT Throughout the Lifecycle of a Device Based on HIMMO";Algosensors 2015, LNCS 9536, pp. 112-128.
PCT/EP2018/050033, ISR and Written Opinion, dated Apr. 5, 2018, 16 Pages.

* cited by examiner

NETWORK DEVICE AND TRUSTED THIRD PARTY DEVICE

CROSS-REFERENCE TO PRIOR APPLICATIONS

This application is the U.S. National Phase application under 35 U.S.C. § 371 of International Application No. PCT/EP2018/050033, filed on Jan. 2, 2018, which claims the benefit of European Patent Application No. 17150389.9, on Jan. 5, 2017. These applications are hereby incorporated by reference herein.

FIELD OF THE INVENTION

The invention relates to a network node, a trusted third party device, an electronic communication method, an electronic trusted third party method, and a computer readable medium.

BACKGROUND OF THE INVENTION

In a traditional public key infrastructure, there is a single root-of-trust, also referred to as a trusted third party, or as a key authority. The trusted third party signs certificates of network nodes that participate in the public key infrastructure. A sending network node can verify the signature on the certificate of a receiving network node to ensure its authenticity and use a public key contained in the certificate to encrypt messages. The sending node can use the private key corresponding to his own certificate to sign messages. The receiving network has the private key corresponding to its public key and decrypts the message with it. Using the certificate of the sending node, and in particular the public key contained in it, the signature can be verified.

Although widespread, there are a number of disadvantages to this system. First of all, when the root of trust is hacked, this compromises the entire system. If an attacker gets access to the root key material of the root of trust, in this case its private key, then the attacker can generate his own certificates. Network nodes receiving messages signed with such a faked certificate will accept it as genuine and act on the contents of the message. In the past, hacked key authorities have been used to distributed malware for example.

An attacker with access to the root key material can do great harm, however legitimate law enforcement cannot get access to the contents of encrypted messages: A hacked root-of-trust allows certificate spoofing, but does not allow legitimate law enforcement to learn the contents of intercepted messages that are encrypted with this system.

For modern telecom systems, the ability to learn the contents of lawfully intercepted messages is often a requirement. For example, consider ETSI TS 101 331 V1.1.1 (2001-08): "In accordance with the relevant lawful authorization a network operator, access provider, service provider shall ensure that: 1) the entire content of communication associated with a target identity being intercepted can be intercepted during the entire period of the lawful authorization".

In the traditional public key infrastructure, the lawful intercept requirement could be met by making sure the private keys of the nodes in the public key infrastructure are available. For example, the root of trust could require that the private key is deposited with it, before it signs a certificate. The problem with providing key material to parties other than the network node to which it corresponds is that with this key material it is possible to spoof messages without any control. This reduces the value of intercepted messages for use during legal proceedings, and makes it susceptible to fraudulent activities.

SUMMARY OF THE INVENTION

A network node is presented as defined in the Claims. The network node uses an identity based key predistribution scheme. Various such schemes exist and can be adapted to the invention. A number of examples of identity based key predistribution schemes are presented herein.

The network node has local key material obtained from at least two different trusted third parties: at least one for confidentiality and at least one for integrity. Accordingly, a lawful intercept authority can be given access only to key material related to confidentiality, e.g., root key material of the trusted third party(s) for confidentiality, or to local key material for confidentiality of this network node. Having such key material, the lawful intercept authority gains the ability to intercept and read communication. However, the lawful intercept authority is not capable of changing the message, at least, not without corrupting a first message authentication code (mac) on the message. Should the message become relevant in a later court case, the intercepted message can be stored at a depositary trusted by all parties, e.g., a notary, after which the second mac can be verified, e.g., by the trusted third party itself, using local key material obtained from the network node, or local (or root) key material obtained from the TTP for integrity. In this way, checks and balances are naturally integrated in the system.

In an embodiment, the first network computes a third key to protect integrity from a further identity and the local key material to protect integrity of the first network node. The third key may be used to compute a second mac. The local key material corresponding to the further identity is not available to the receiving second network node. Accordingly, the second mac cannot be tampered with by the receiving network node. This increases non-repudiation properties of the system.

Additional advantages of the devices and method according to the invention are set out herein.

The invention may be applied, e.g., in any communication medium that requires lawful intercept and/or requires proof that the sender actually sent the message, e.g. WhatsApp, telegram, 5G phoning, communications between a patient and doctor, etc. For example, the network nodes may be phones, such as smart phones, mobile computers, laptops, tables, notebooks, computers, smart-cards, and the like. For example, the network nodes may be sensor nodes in a sensor network, lighting units in a lighting network, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a network node, FIG. 1b schematically shows an example of an embodiment of a network node, FIG. 1c schematically shows an example of an embodiment of a network node, FIG. 2 schematically shows an example of an embodiment of a communication system, FIG. 3 schematically shows an example of an embodiment of a trusted third party device, FIG. 4 schematically shows an example of an embodiment of a trusted third party device, FIG. 5 schematically shows an example of an embodiment of an electronic communication method, FIG. 6 schematically shows an example of an embodiment of an electronic trusted third party (TTP) method for integrity, FIG. 7a schematically shows a computer readable medium having a writable part comprising a computer program according to an embodiment, FIG. 7b schematically shows a representation of a processor system according to an embodiment.

LIST OF REFERENCE NUMERALS, IN FIGS. 1-5

Figure 1A:
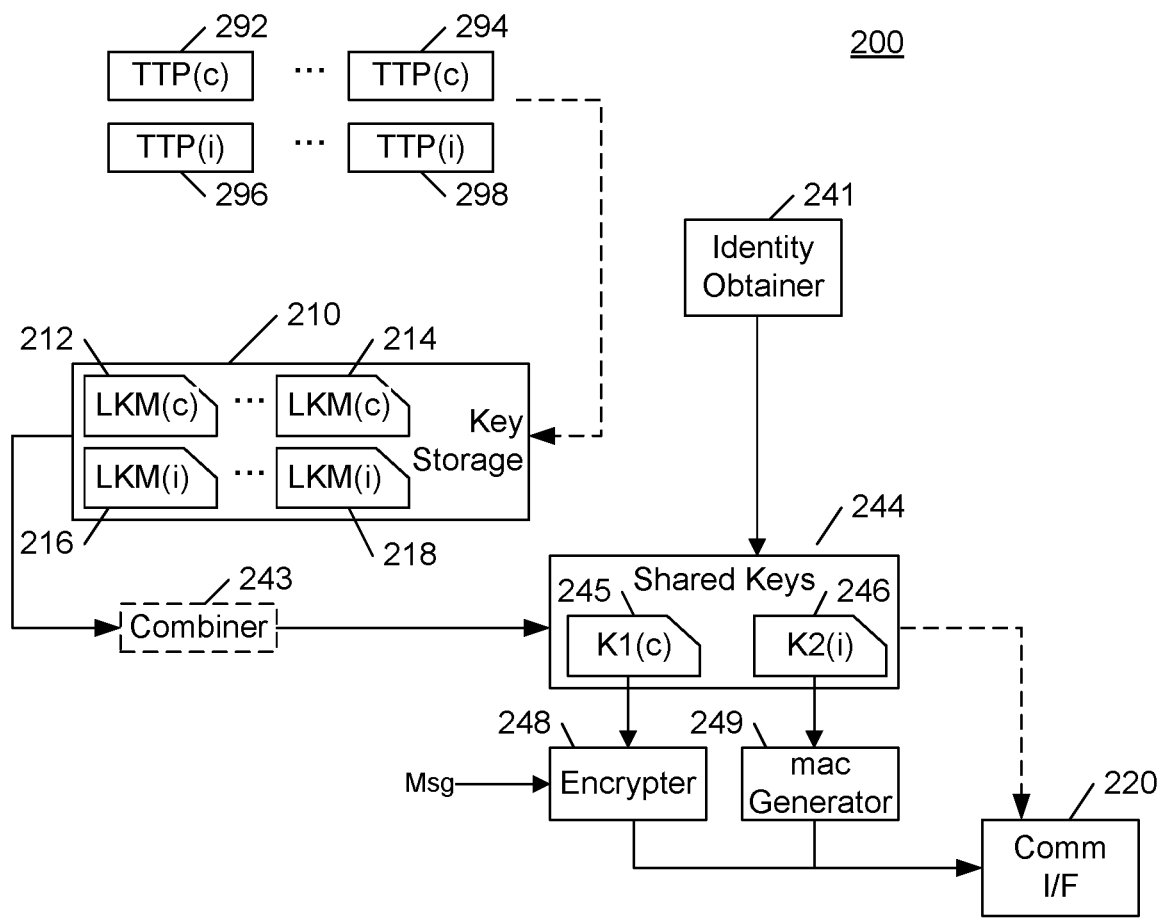

100 a first network node
110, 160 a key storage
120, 170 a communication interface
130, 180 a processor circuit
150 a second network node
190 a digital network
192 a trusted third party for confidentiality
194 a trusted third party for integrity
195 a communication system
200, 202 a first network node
201 a second network node
210, 260 a key storage
212, 213, 214 local key material to protect confidentiality
216, 217, 218 local key material to protect integrity
220, 265 a communication interface
241, 271 an identity obtainer
242 a further identity obtainer
243, 273 a combiner
244, 274 a shared key unit
247 a third key
245 a first shared key to protect confidentiality
246 a second shared key to protect integrity
248 an encryption unit
249 a mac generation unit
278 a decryption unit
279 a mac verification unit
292, 293, 294 a trusted third party for confidentiality
296, 297, 298 a trusted third party for integrity
300 a trusted third party device
310 a key storage
322 a first communication interface
324 a second communication interface
330 processor circuit
400 a trusted third party device
410 a key storage
422 a first communication interface
424 a second communication interface
432 a local key material generator
434 a mac verification unit
442 a second identity
444 a sending second identity and a receiving second identity
446 a message and a message authentication code

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

The invention makes use of so-called identity-based key predistribution schemes. These schemes provide a way to perform key agreement between two parties using local identity based key material. Below some background on identity-based key predistribution schemes is provided.

An identity-based key predistribution scheme has two phases: key predistribution and key derivation. Associated with the two phases of the identity-based key predistribution scheme are two algorithms: a local key material generation algorithm and a key establishment algorithm, respectively.

The identity-based key predistribution scheme is set up by providing a trusted third party with root key material. The trusted third party may be the manufacturer of the device, and may, e.g., provision devices during their manufacturing or in some other trusted environment. Alternatively, the trusted third party may be a certificate authority device, e.g., a device that provisions devices, e.g., using some online protocol.

During key predistribution local key material is generated for each network node and stored on the network node, by applying the local key material generation algorithm on the root key material and an identifier of each network node. During the key derivation phase, two network nodes can derive a shared key by applying the key establishment algorithm on their local key material and the identifier of the other network node. For example, a first node may apply the key establishment algorithm on the second identifier of the second network node and its own first local key material, while the second node may apply the key establishment algorithm on the first identifier of the first network node and its second local key material. The result of the key establishment algorithm is an identity-based key shared between two network nodes.

There exist a number of identity-based key predistribution schemes. For example, an identity-based key predistribution scheme is described in "HIMMO—A lightweight collusion-resistant key predistribution scheme", by Oscar Garcia-Morchon, Domingo Gomez-Perez, Jaime Gutierrez, Ronald Rietman, Berry Schoenmakers and Ludo Tolhuizen. Published in Cryptology ePrint Archive, Report 2014/698. An improved version of HIMMO is described in European patent application "Improved system for key sharing" filed with the EPO, as EP15200857.9, of the same applicant, and incorporated by reference. HIMMO, like some other identity-based key-distribution schemes, has the disadvantage that the unprocessed keys may be slightly off. This may be accepted, that is, it may be accepted that in a small percentage the key agreement may fail. Alternatively, one of the parties may compute additional key-reconciliation data (also referred to as helper data), which may be needed to arrive at a shared key. The key-reconciliation data is usually generated by the first network node that has access to both identities, e.g., the first network node, if the first network node received the second network node identity before starting computing the shared key.

HIMMO is an identity-based key predistribution scheme based on the Hiding Information (HI) and Mixing Modular Operations (MMO) problem. HIMMO is lightweight and more quantum-safe since all existing attacks rely on lattices. In HIMMO, the TTP has some secret root keying material, e.g., a bivariate function $R(x,y)$. The TTP can extract a secret function $G\_A(x)$ for a node A from its root keying material ($G\_A(x)=R(A,y)$ where this operation is done as described in HIMMO). When A and B wish to establish a common key, A evaluates $G\_A(x=B)$ and B evaluates $G\_B(x=A)$.

Another usable identity-based key predistribution scheme is described in "Perfectly-Secure Key Distribution for Dynamic Conferences" by Carlo Blundo, et al. This scheme has the advantage that key agreement cannot fail, and that no key-reconciliation data is needed. On the other hand, the scheme of Blundo is much less resilient against collusion attacks.

In an embodiment, the root key material comprises a bivariate polynomial and the local key material comprises a univariate polynomial. For example, in the Blundo identity-based key predistribution scheme the root key material is formed by a bivariate polynomial $f(x, y)$. Local key material g for and a first node with identifier $ID_1$, is formed by collapsing the bivariate to a univariate polynomial $g(y)=f(ID_1, y)$. A node with local key material g and the identifier of a second node $ID_2$ obtains a shared key by computing $g(ID_2)$. All polynomial computations may be done modulo a modulus m.

Some identity-based key predistribution schemes have the property that local key material received from different TTPs, but generated for compatible parameters, e.g., same degree, and moduli, may be combined at the local network node to form new local key material. The new local key material can be used just as key material generated directly by a TTP but has the advantage that the new local key material has not been seen by any of the separate TTPs. This makes such combined new local key material more secure in case a TTP is hacked.

A problem with key predistribution schemes is that they generate a symmetric key. Thus a receiver could fake a message authentication code for a message with the symmetric key and claim it received the message from a sender, and the cryptographic system has no way of proving that the message was spoofed.

Figure 1B:
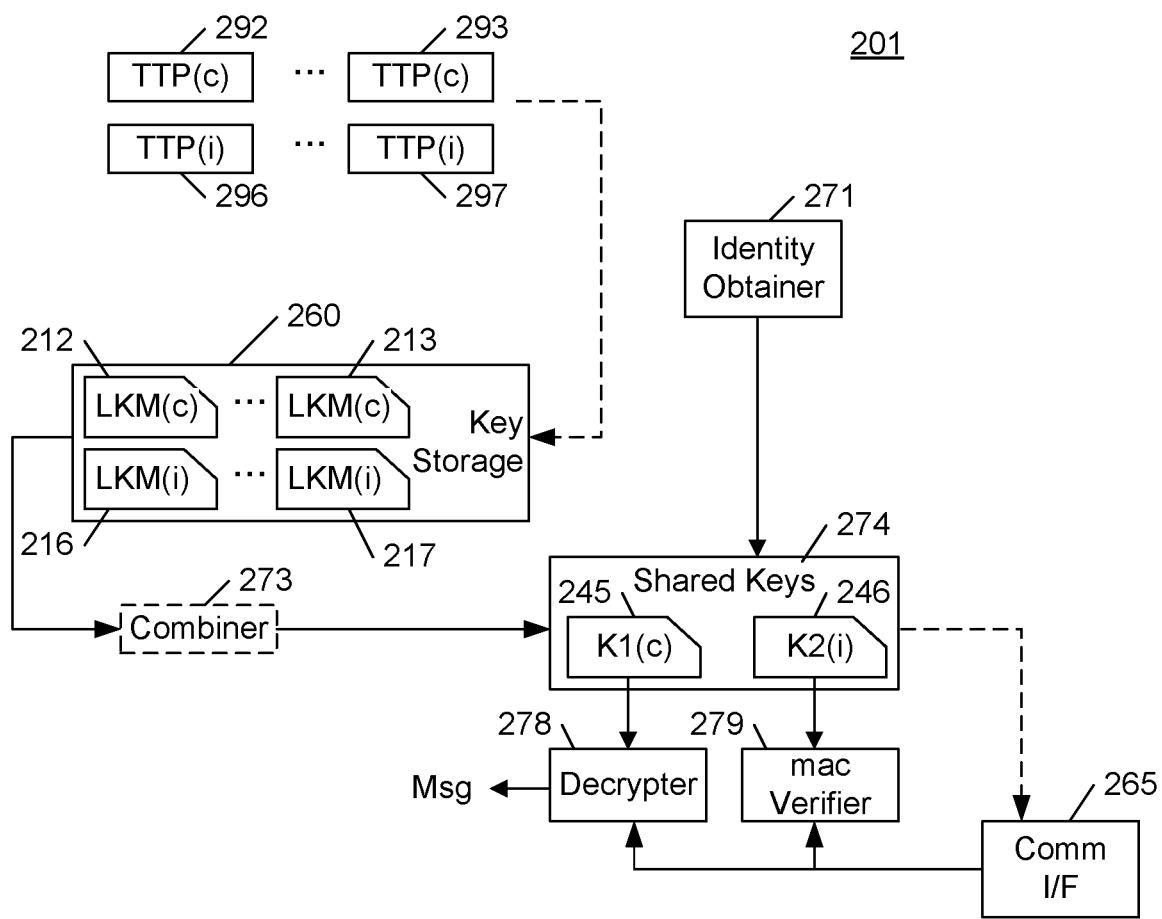

FIG. 1a and FIG. 1b each schematically shows an example of an embodiment of a network node. The first network node 200 illustrated in FIG. 1a is arranged to cooperate with the second network node 201 illustrated in FIG. 1b. First network node 200 comprises a key storage 210 arranged to store local key material generated by a local key material generation algorithm of an identity-based key predistribution scheme. Key storage 210 comprises local key materials of two different types; at least one local key material for each type.

Local key material of the first type is local key material to protect confidentiality of communication between the first network node and other network nodes. This local key material has previously been generated by a trusted third party (TTP) for confidentiality using a local key material generation algorithm of an identity-based key predistribution scheme for a first identity of the first network node.

There is at least one TTP for confidentiality in the system, but there may be more. FIG. 1 a shows two TTPs for confidentiality: TTP 292 and TTP 294. For each TTP that is used, a local key material is received. In this case, key storage 210 stores local key materials to protect confidentiality 212, and 214, corresponding to TTP 292 and TTP 294. There may be a single TTP for confidentiality, for example, all TTPs for confidentiality but TTP 292 may be removed from the system. A communication is protected for confidentiality if its content cannot be read without access to the relevant key material.

Local key material of the second type is local key material to protect integrity of the communication between the first network node and the other network nodes. This local key material to protect integrity has previously been generated by a TTP for integrity using a local key material generation algorithm of an identity-based key predistribution scheme for a second identity of the first network node, There is at least one a TTP for integrity in the system, but there may be more. FIG. 1a shows two TTPs for integrity: TTP 296 and TTP 298. For each TTP that is used, a local key material is received. In this case, key storage 210 stores local key materials to protect integrity 216, and 218, corresponding to TTP 296 and TTP 298. There may be a single TTP for integrity. For example, all TTPs for integrity but TTP 2926 may be removed from the system. A message is protected for integrity if, e.g., the content of a message cannot be changed undetected without access to the relevant key material.

The TTP for confidentiality and the TTP for integrity are different TTPs. This means that they use at least different root key material. Possibly the parameters of the TTPs may be the same so that local key material may be combined by a node. However, it is important that a TTP for confidentiality cannot generate local key material corresponding to the root key material of a TTP for integrity, and more in particular, cannot generate the shared keys that are obtained from such local key material generated by a TTP for integrity. In general, this condition can easily be satisfied, by choosing different secret root key material. For example, if HIMMO or Blundo based systems are used, the root key material may comprise different polynomials. In an embodiment, the TTP(s) for confidentiality and the TTP(s) for integrity are implemented on physically separate servers. The TTP(s) for confidentiality and the TTP(s) for integrity may be located in different jurisdictions, e.g., different countries. A different TTP may use the same scheme, but with different root key material. In order to combine key material, some key predistribution schemes require that the TTPs use the same parameters (e.g. moduli) but different root key material (e.g., polynomials, matrices, etc.). Typically, it is also required that local key material is generated for the same first or second identity.

The first and second identity of the first network node referred to above are identities suitable for the identity based key predistribution scheme that is used. Typically, these identities are not secret, although the local key material is secret. The identities may be the same or obtained from such identifying information as serial numbers, network addresses, e.g. IP addresses, MAC addresses, real names, and the like. The first and/or second identity may be generated from a master identity, or from credentials. For example, a hash of an X.509 certificate, possibly an X.509 certificate without a signature, could be used as an identity. Deriving the identities form identifying information has an advantage of implicit authorization by the TTP. Deriving the identities may use a key derivation function (KDF). An example of a KDF is given in e.g., the CMLA_KDF from CMLA Technical Specification, Version: V1.43-20131218, or the KDF function defined in "DRM specification", OMA-TS-DRM-DRM-V2_0_2-20080723-A, Open Mobile Alliance™ Version 2.0.2, section 7.1.2, etc. The key derivation function may be applied to the entries of V, e.g., after concatenation.

The first and second identity may be stored in a storage of first network node 200 (this storage is not separately shown). Alternatively, the information from which the first and second identity may be derived may be stored at network node 200.

In an embodiment, the first and second identities are equal. In fact, this is an easy way to implement the system which does not seem to have any detrimental effects to the security.

If an identity-based key predistribution scheme is used that allows combination of local key material, then a network node that receives multiple local key materials for confidentiality or multiple local key materials for integrity, then the network node may combine the multiple local key materials and store the combined key material, e.g., a combined local key material for confidentiality and/or a combined local key material for integrity. However, there are advantages in keeping the uncombined local key materials, and combining them later as needed.

First network node 200 comprises a communication interface 220 arranged for digital communication between the first network node and the other network nodes. For example, the other node may be second network node 201 described below. Communication interface 220 may be configured to communicate over a digital network, e.g., a wireless network such as Wi-Fi, or a wired network, such as Ethernet, or a combination thereof. For example, the digital network may be a sensor network, or the Internet, etc. Local key material may be stored on a network node through its communication interface, e.g., communication interface 220; however, out of bounds methods are possible, e.g., transfer using a memory device, e.g., a memory stick, while the communication interface 220 is a wireless network interface, etc.

First network node 200 comprises an identity obtainer 241 configured to obtain a first and second identity of a second network node, e.g., second network node 201. The first and second identity of the second network node may also be the same. The first and second identity of a second network node may be obtained in the form of identifying information from which the first and second identity is derived, e.g., by applying a hash function. The key identity, first identity and/or second identity may be received from the other node, or retrieved from a local address book, or retrieved from an online address book, etc.

First network node 200 is arranged to send communications, e.g., a digital message, to the second network node. For example, the communications could be digital messages, e.g., network messages, protocol messages, e-mails, documents, and the like.

First network node 200 may comprise an optional combiner 243. In case, storage 210 comprises multiple local key materials for confidentiality or multiple local key materials for integrity, combiner 243 obtains a single local key material for confidentiality and a single local key material for integrity.

For example, combiner 243 may be arranged to combine local key materials of the same type for which it is known that the second network node has local key material received from the same TTPs, e.g., generated from the same root key material. For example, first network node 200 may have received a message from second network node 201 with the TTPs it supports. In this case, the local key material may be combined as is appropriate for the scheme, e.g., by adding modulo a modulus. Alternatively, combiner 243 may not combine but select one of possibly multiple local key materials, e.g., one for each type. If only a single TTP for confidentiality and a single TTP for integrity is used in the system, then no combiner 243 is needed.

First network node 200 comprises a shared key unit 244. Shared key unit 244 is arranged to compute two keys: a first shared key 245 to protect confidentiality and a second shared key 246 to protect integrity.

The first shared key 245 to protect confidentiality is computed from the first identity of the second network node and the local key material to protect confidentiality of the first network node. In an embodiment, only one local key material to protect confidentiality is used, e.g. local key material to protect confidentiality 212. In an embodiment, a combined local key material to protect confidentiality is used, e.g., as computed by combiner 243. For example, shared key unit 244 may be arranged to apply a key establishment algorithm to the first identity of the second network node and the local key material for confidentiality.

The second shared key 246 to protect integrity is computed from the second identity of the second network node and the local key material to protect integrity of the first network node. In an embodiment, only one local key material to protect integrity is used, e.g. local key material to protect integrity 216. In an embodiment, a combined local key material to protect integrity is used, e.g., as computed by combiner 243. For example, shared key unit 244 may be arranged to apply a key establishment algorithm to the second identity of the second network node and the local key material for confidentiality.

If the identity based key predistribution system requires it, shared key unit 244 may also compute key reconciliation data. For example, in some instances key reconciliation data may be a number of least significant bits of a shared key (in which case, the shared key may be chosen correspondingly longer to compensate for the loss of secrecy). In FIG. 1 a, sending of optional key reconciliation data is indicated by a dashed line from shared key unit 144 to communication interface 220. Note that some schemes, e.g., Blundo, do not require key reconciliation data.

First network node 200 comprises an encryption unit 248. Encryption unit 248 is arranged to encrypt the message using the first shared key 245. For example, encryption unit 248 may be arranged to apply a block cipher, e.g., AES, triple-DES, Blowfish, etc., the block cipher may be arranged for a mode for encryption, e.g., cipher block chaining (CBC), counter mode (CTR), etc.

First network node 200 comprises a mac generation unit 249. Mac generation unit 249 is arranged to compute a first message authentication code over the message using the second shared key 246. For example, mac generation unit 249 may be arranged to apply a mac algorithm, e.g., an HMAC based on a hash algorithm such as SHA-1, SHA-256, etc., or a block cipher based mac, e.g., CBC-MAC, e.g., based on AES, triple-DES, Blowfish, etc. There are a number of ways in which the mac can be generated over the message. For example:

MAC-then-Encrypt: Compute the MAC on the cleartext message, append it to the message, and then encrypt the whole.

Encrypt-and-MAC: Compute the MAC on the cleartext message, encrypt the cleartext, and then append the MAC at the end of the cipher text message.

Encrypt-then-MAC: Encrypt the cleartext, then compute the MAC on the cipher text, and append it to the cipher text. Note, that in this case, the initialization vector (IV) and an encryption method identifier may be included in the MACed data.

Finally, the encrypted message, and the first message authentication code are sent to the second network node over the communication interface 220. If key reconciliation data is needed to guarantee successful generation of the first and/or second key, then key reconciliation data may also be sent to the second network node. For example, the encrypted message, the first message authentication code, and possibly the key reconciliation data may be included in one larger message.

Note that the encryption and mac generation use different keys, which are derived from local key material that is received from different TTPs. A message that has been intercepted can be decrypted by a lawful authority if the root key material of the TTPs for confidentiality and/or the local key material generated by the TTPs for confidentiality for the first network node is obtained, e.g., from the TTPs for confidentiality. However, even if the authority has access to this root/local key material, it cannot spoof the macs on these messages. Compare this to a system in which both confidentiality and integrity protection is done using key material obtained from the same TTPs. In such a case, anyone who can decrypt a message necessarily is also able to generate MAC codes for that message. In other words, a lawful authority in such a system has the ability to counterfeit evidence. Even if no lawful authority would ever use such a capability, it diminishes the value of the message as evidence, if only because it could have been tampered with.

If multiple TTPs are used, an additional advantage is that all TTPs must agree that the request of key material is lawful. This makes it more likely, that only lawfully correct requests for key material are honored, as more than one TTP is to verify the legality of the request.

FIG. 1b schematically shows an example of an embodiment of a second network node 201 which is arranged to cooperate with the first network node 200 illustrated in FIG. 1a. The first network node 200 shown in FIG. 1a is arranged to send a message, while second network node 200 shown in FIG. 1b is arranged to receive a message. The embodiments of FIGS. 1a and 1b may be combined to obtain a network that is capable both of sending and receiving messages.

The second network node 201 is similar to network node 200. Below some of the salient differences between the two are explained.

Like first network node 200, also network node 201 comprises a key storage 260. Key storage 260 also stores local key material to protect confidentiality and local key material to protect integrity. Second network node 201 may have received its local key material from different TTPs, but if the first and second network nodes are to communicate successfully there should be an overlap of at least one TTP for confidentiality and at least one TTP for integrity. For example, this is achieved if only a single TTP for confidentiality and a single TTP for integrity is used.

In the embodiment, illustrated in FIGS. 1a and 1b there is shown at least the common TTP 292, and TTP 296. If this is the only common TTP, then the corresponding local key material is to be used. If there are more common TTPs, then their local key materials may be combined.

Second network node 201 comprises an identity obtainer 271 arranged to obtain a first and second identity of the first network node. Identity obtainer 271 may work the same as identity obtainer 241. The first and second identity of the first network node 200 may be received together with a communication of first network node 200, e.g., an encrypted message. Identity obtainers 241 and 271 may also find the first and/or second identity in a public database, a local address book, and the like.

Second network node 201 comprises a communication interface 265, e.g., of the same of similar type as communication interface 220. Through the communication interface 265 an encrypted message and a first message authentication code may be received from first network node 200.

Second network node 201 may comprise an optional combiner 273 to select and/or combine local key material generated by common TTPs. Second network node 201 comprises a shared key unit 274 arranged to compute the first shared key 245 to protect confidentiality from the first identity of the second network node and the local key material to protect confidentiality of the first network node, compute a second shared key 246 to protect integrity from the second identity of the second network node and the local key material to protect integrity of the first network node.

The shared key unit 274 may be arranged to use key reconciliation data received from the first network node 200 to compute the first and/or second key. For example, the key reconciliation data may be received over communication interface 265, e.g., together with the encrypted message, and/or the first mac. This has been illustration with a dashed line from interface 265 to shared key unit 274.

Second network node 201 comprises a decryption unit 278 arranged to decrypt the encrypted message using the first shared key. Second network node 201 comprises a mac verification unit 279 arranged to verify the first message authentication code using the second shared key.

If mac verification unit 279 detects that the mac is not correct, it may raise an alarm, e.g., sending an error message to a user of second network node 201, e.g., sending an alarm message to a further party, e.g., to a further server, etc.

Note, that the second network node 201 is capable both of decrypting and verifying the integrity of the message. However, a lawfully intercepted message can selectively only be allowed to be decrypted, depending on the access given to the lawful authorities to key material.

Embodiment thus have the advantage that (a) both sender and receiver can encrypt and decrypt message and verify a MAC using their local key materials.

(b) Lawful intercept is possible, if the TTPs for confidentiality agree, while spoofing by lawful interceptors is not possible as long as the TTPs for integrity do not agree.

Figure 1C:
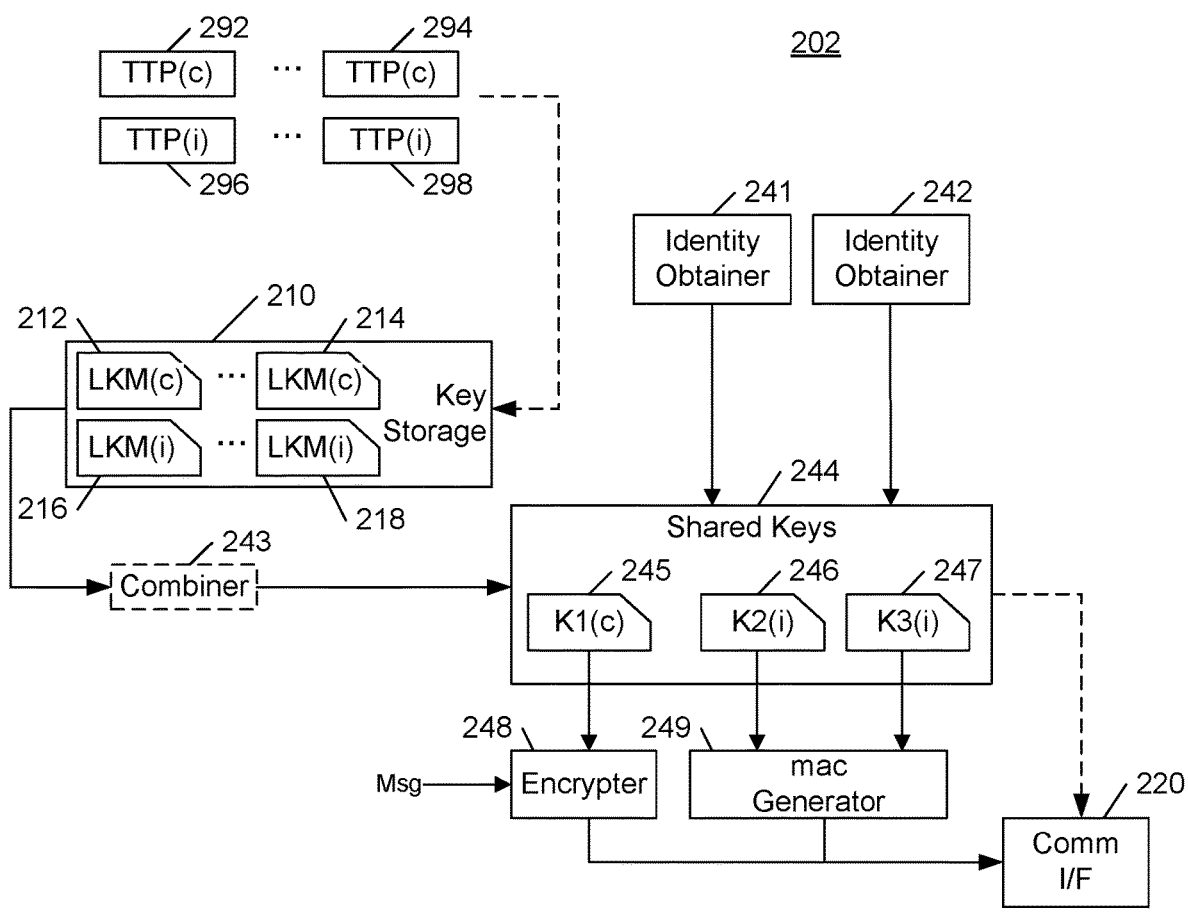

FIG. 1c schematically shows an example of an embodiment of a first network node 202. Network node 202 builds on network node 200, but is extended with further advantageous functionality. First network node 202 is configured to send a message to a second network node. For the receiving node, e.g., a second network, one may use network node 201, which has been adapted to ignore any additional elements added by an embodiment according to FIG. 1c, e.g., a second mac (see below).

In addition to the elements described with respect to FIG. 1 a, first network node 202 comprises a further identity obtainer 242. The further obtainer 242 is configured to obtain a further identity. The further identity is different from the first and second identity of the second network node. What is important is that the second network nodes do not have local key material corresponding to the further identity. In an embodiment, the further identity is also chosen different from the first and second identity of the first network node. In fact, preferably, none of the network nodes have access to the local key material corresponding to the further identity, which means the further identity is chosen differently from any identity used by a common network node. In this case, a common network node is a network which does not have access to local key material corresponding to the further identity or root key material.

For example, the further identity may be chosen so that it is unknown to the second network node, which implies that he also does not have the corresponding key material. There are however many different ways to select a further identity, with different advantages. Some of these options are discussed below.

Shared key unit 244 is arranged to compute a third key 247 to protect integrity from the further identity and at least the local key material to protect integrity of the first network node. For example, shared key unit 244 may be arranged to apply the key establishment algorithm to the further identity and the local key material for integrity to obtain a third key 247. Mac generation unit 249 is arranged to compute a second message authentication code over at least the message using the third key. Finally, the second message authentication code is sent to the second network node, e.g., together with the encrypted message and the first message authentication code. Alternatively, the second message authentication code is sent to a trusted authority which is trusted to keep the second mac, so that, should this ever be necessary, the authenticity of the message can be proved. When sending to a trusted authority, e.g., a TTP for integrity, a message identifier may be included so that later finding of the message is facilitated, e.g., a sequence number, a timestamp, a hash of the message, possibly even the message itself. The further identifier may also be included.

To recover the third key one may use

A: the further identity and the local key material to protect integrity of first network node 202, or B: the second identity of first network node 202 that corresponds to the local key material to protect integrity and local key material generated for the further identity by the same TTP(s) that generated the local key material to protect integrity of first network node 202.

First network node 202 is able to compute the third key, because he is in possession of all elements of option A. The second network node cannot compute the third key, since the second network node is neither in possession of the elements of option A (the second network node does not have access to the local key material to protect integrity of first network node 202), nor in possession of the elements of option B (the second network node does not have local key material corresponding to the further identity, in particular the further identity is different from the identities for which the second network node does have local key material).

As a result, the second mac provides a good assurance that the message has not been tampered with, and was really written by first network node 202: even though the third key is a symmetric key, the receiving party, the second network node, does not have access to the third key and is not capable to spoof the second mac. A side effect of this is that the second network node is also not capable of verifying the second mac. This is not necessarily a problem though, especially not as the second network node can verify the first mac.

One option to obtain the further identity is to configure further identity obtainer 242 to randomly select the further identity. If the further identity is random, it is automatic that it is unequal to the first and second network identity of the second network node. In an embodiment, the bit size of identities is chosen so that collisions between randomly assigned identities are unlikely. In that case, also a randomly chosen further identity will be unlikely to be equal to an identity of another node. For example, bit size of identities may be chosen depending on the number of network nodes in the system, and/or on the number of expected communications. For example, an identity may be 32 bit, 64 bit, 128 bit, 256 bit, or more, etc.

Interestingly, by choosing a random further identity it is also ensured that the corresponding local key material has not yet been generated by the TTP(s) for protecting integrity. This means that at the moment of computing the second mac, the first network node 202 is the only network node that has access to the third key. Only when the TTP(s) for protecting integrity decide to compute the local key material corresponding to the further identity does it become possible for other entities to compute the third key. This option therefore gives a high assurance that the second mac, if it is correct, was really computed by the first network node. Instead of choosing the further identity fully randomly, it could also be selected from some large set.

First network node 202 is configured to send the further identity to the second network node or to the trusted party. In this way, the further identity, which will be needed to later compute the third key, say in case of a court case, to verify a lawful intercept, is available to any interceptor who can intercept the message in the first place. The same holds for key reconciliation data, it needed.

There are various ways to avoid sending the further identity, and thus reduce the overhead incurred by the system. For example, the further identity may be a fixed identity, or chosen from a small set of allowed further identities. In this case, the further identity may be known to all or many network nodes. This is not a problem, as still the network nodes to not have local key material generated for the further identity. Such key material would be needed to compute the third key (together with the second identity of the first network node).

As a further example, the further identity may be generated from the message itself, e.g., by applying a hash function to message, or a KDF, etc. In an embodiment, a random salt is attached to the message before deriving the further identity from it, e.g., by applying a hash to the combination of the message and the salt. This has the advantage that the further identity may be computed from the message as desired, and so does not need to be transferred. At the same time the further identity has a random character so that it is unlikely that the corresponding local key material has yet been generated. The salt may have a smaller bit size than the further identity, e.g., 32 and 64 bits, etc. Larger identities are possible, e.g., 128 bit. If a salt is used, it may be communicated to any party that receives the second mac, e.g., the second network node.

Interestingly, the further identity may be chosen as the second identity of the first network node 202. Note that normally, a key is derived from the identity of the other party and one's own key material. By computing a key from one's own identity and key material a key is obtained that cannot be recomputed by any other party, except if it has access to the local key material of the first network node. The latter will not be the case for common network nodes. However, the TTP(s) for protection of integrity are able to compute the local key material for any identity and can thus also compute the third key.

In these cases, in which the further identity is already known, or can be derived from the message, it is not needed to send the further identity to the second network node. If a salt is used, it may be needed to send the salt though.

The second mac is computed over the message, but as above for the first message authentication, there are various ways to do this. For example, the second mac may be computed directly over the plain text of the message, over the encrypted message, over the message together with the first mac, over the encrypted message together with the first mac, etc. In an embodiment, the second message authentication code is computed over at least the message and the first message authentication code. The latter option allows verifying if the first mac was altered without the need to know the key used to compute the first mac.

In an embodiment, the second mac is computed over at least the plaintext message, and possibly the first mac. This had the advantage that a TTP for integrity can only verify, and thus only change, a mac, if it has access to the plain text. However, a TTP for integrity cannot obtain the plain text himself. The TTP is dependent on TTPs for confidentiality. In this way, the two types of TTP keep each other in balance.

The local key material to compute the third key may be the same local key material to compute the second shared key. Also for the third key, local key material of multiple TTPs may be combined. In fact, for the third key it is not even necessary to ensure that the second network node has key material from the same TTPs. In an embodiment, also local key material of TTPs for confidentiality is mixed in with the local key material of TTPs for integrity. For example, in an embodiment, combiner 243 is configured to combine the local key material for confidentiality and the local key material for integrity forming a combined local key material, the third key being derived from the further identity and the combined local key material.

Combining more local key material has the advantage that is becomes harder for rogue TTPs to tamper with the MACs on messages, since all TTPs whose local key material has been used need to participate in the fraud.

Some key predistribution schemes do not have the option of combining local key material directly. Such schemes can also be used in an embodiment, even with combining, however in this case, first intermediate keys are computed for the local key materials separately, which are then combined to form a single key. The latter combining may be done by any key derivation algorithm, e.g., KDF, or a direct XOR on the intermediate keys. For example, in an embodiment, shared key unit 244 is configured to compute the third key by first obtaining an intermediate third key from the further identity and the local key material to protect integrity of the first network node, and combining the intermediate third key with the first key.

The invention addresses multiple problems by for example one or more of the following aspects (a) using at least 1 additional TTP for the MAC over the message that is not used for the body of the message, and (b) including in the message a second message by the sender, not addressed to the receiver, but to a further identity solely managed by this additional TTP, this message again including the MAC over the message. The further identity may be the identity of a party to which the second mac is addressed, but this is not necessary.

Note that a lawful interception entity can check whether the receiver spoofed receiving a message by decrypting the MAC for the further identity. The lawful interception entity cannot fake this information.

In addition, messages often cross multiple jurisdictions that may have different rules regarding lawful intercept. Using an embodiment of the current invention, each jurisdiction can get the intercept and/or verification capabilities it requires; for example, by generating a second mac using the TTPs of the appropriate jurisdiction. For example, multiple second macs may be generated using TTPs in different jurisdictions.

Figure 2:
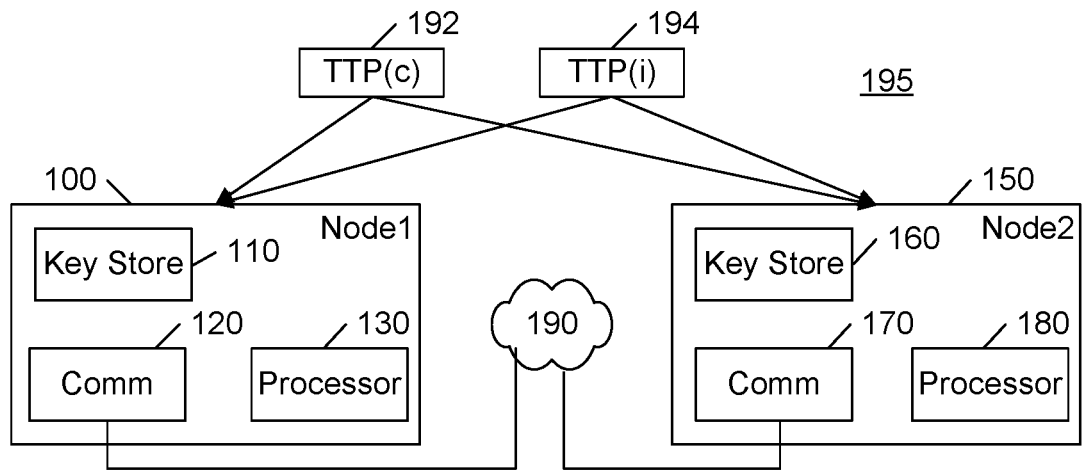

FIG. 2 schematically shows an example of an embodiment of a communication system 195.

Communication system 195 comprises multiple network nodes. Shown in FIG. 2 are a first network node 100 and a second network node 150. There may be more network nodes, e.g., more than 100, 1000, 10000, etc.

Communication system 195 comprises at least two TTPs: a trusted third party for confidentiality 192, and a trusted third party for integrity 194. There may be more than one TTPs of each kind.

The network nodes are configured to communicate with each other, e.g., to send each other digital messages, over a digital network 190. The network nodes have a communication interface configured to communicate to other network nodes over digital network 190. Shown in FIG. 2 are a communication interface 120 in first network node 110 and a communication interface 170 in second network node 150.

In an embodiment, the network nodes are configured to protect the confidentiality and the integrity of messages with local key material obtained from the different TTPs. The local key material may be stored in a key storage. A key storage may be a non-volatile electronic memory, magnetic or optical storage, and the like. Shown in FIG. 2 are a key storage 110 in first network node 110 and a key storage 160 in second network node 150.

Each network node comprises a processor circuit. Shown in FIG. 2 are a processor circuit 130 in first network node 110 and a processor circuit 180 in second network node 150. The processor circuit is configured to protect a message for confidentiality and integrity according to an embodiment, and to decrypt and verify a message. For example, the processor circuit may be configured for an embodiment illustrated with any one of FIGS. 1a, 1b and 1c.

Figure 3:
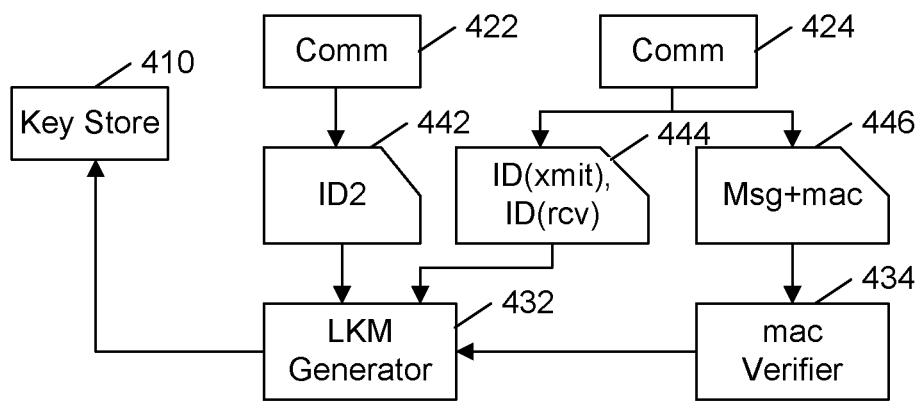

FIG. 3 schematically shows an example of an embodiment of a trusted third party device to protect integrity 400. This TTP device 400 may be used in cases in which a single TTP for integrity is used, and in which the network nodes do not mix local key material for of multiple TTPs to obtain the third key. If local key material is mixed, other approaches are possible. For example, a TTP may provide local key material, e.g., computed as below, to a further TTP that combines the local key material, computes the second or third key, and verifies the first or second mac.

TTP 400 comprises a key storage 410 arranged to store root key material. The root key material is according to the key predistribution scheme that is used. From the root key material and an identity, local key material can be computed.

TTP 400 comprises two communication interfaces: a first communication interface 422, and a second communication interface 424. These may be implemented by sharing a single communication interface for multiple purposes, but this is not needed.

The first and second communication interfaces may be protected in different manners. For example, the first communication interface may be used, e.g., in a production environment, in which a large number of requests for local key material is made from a small number of requestors, e.g., manufacturers, of mobile phones, smart cards, etc. For example, to accommodate this demand, the first communication interface may be a digital computer network interface in which requestor authenticate themselves, e.g., using a traditional X.509 authentication system. The second communication interface may be used, e.g., by law enforcement. The second communication interface may be done in a similar way as the first communication interface, e.g. a protected digital computer network interface, but it may also be different.

For example, second communication interface 424 may be implemented using a so-called out-of-band mechanism, which requires special access to TTP 400, e.g., local access through the server, e.g., through a local keyboard, local usb port, etc. Both the first and second communication interface may require some type of authentication, e.g., a cryptographic authentication token, a dongle, etc.

First communication interface 422 is arranged to receive a second identity 442. The second identity 442, corresponds to a second identity of a network node for which the local key material to protect integrity is to be computed.

TTP 400 comprises a local key material generator 432. Local key material generator 432 is configured to compute first local key material to protect integrity by applying a local key material generation algorithm of an identity-based key predistribution scheme to the second identity and the root key material.

The first communication interface 422 and local key material generator 432 may be used in TTP 400 to compute local key material for network nodes. For example, TTP 400 may be used in manufacturing network nodes, and to provide the network nodes with local key material. For example, TTP 400 may use communication interface 422 to respond to a request for local key material comprising identity 442 with the corresponding local key material. Local key material is secret to all network nodes except the one which corresponds to identity 442, so appropriate care should be taken to protect TTP 400 and its interfaces.

Second communication interface 424 is arranged to receive a sending second identity and a receiving second identity. The sending second identity and the receiving second identity are together indicated as 444. Second communication interface 424 is further arranged to receive a message, and a message authentication code. The message and a message authentication code are indicated together as 446. The sending second identity 444 corresponds to the second identity of network node, which used its previously generated local key material and a receiving second identity, e.g., the receiving second identity of a second network node, to compute a mac (referred to above as the first mac) for the message. This first mac is to be verified. TTP 400 comprises a mac verification unit 434 arranged to verify the combination of a message authentication code and a message 446 using a second shared key.

There are at least two ways for TTP 400 to proceed.

In a first option, local key material generator 432 is configured to compute second local key material to protect integrity by applying the local key material generation algorithm of the identity-based key predistribution scheme to the root key material and the sending second identity. In this case, the same local key material is obtained as was used by the sending network node. Mac verification unit 434 is arranged to compute a second shared key from the second local key material to protect integrity and the receiving second identity, In a second option, local key material generator 432 is configured to compute second local key material to protect integrity by applying the local key material generation algorithm of the identity-based key predistribution scheme to the root key material and the receiving second identity. Mac verification unit 434 is arranged to compute a second shared key from the second local key material to protect integrity and the sending second identity, Once mac verification unit 434 has verified the mac over the message, it can send an appropriate response message, e.g., indicating that the mac was or was not correct.

This TTP 400 has the advantage that no key material needs to be disclosed to verify a mac. Similarly, a TTP 400 could verify a second mac, from either the second identity of the first network node that sent a message, or from the further identity selected by the first (sending) network node. The further identity could be received through second communication interface 424, e.g., if the further identity is a random identity, or the further identity may be known by TTP 400, e.g., stored in a local storage of TTP 400, or the further identity may be computed from the message.

Figure 4:
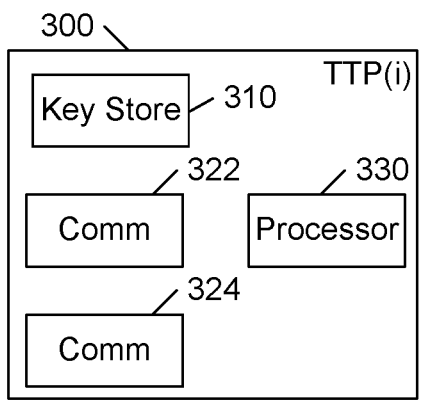

FIG. 4 schematically shows an example of an embodiment of a trusted third party device to protect integrity 300. TTP 300 may work in the same way as TTP 400. TTP 400 comprises a key storage 310, e.g., a (non-volatile) electronic memory, e.g., a magnetic or optical storage etc. TTP 300 comprises a first communication interface 322, and a second communication interface 324. The communication interface may be network interface, keyboards, communication ports, e.g., usb ports, and the like. TTP 300 comprises a processor circuit 330 configured according to an embodiment, e.g., an embodiment illustrated by FIG. 3.

The inventors realized that the following clauses are also advantageous. The Applicant hereby gives notice that new claims may be formulated to such clauses and/or combinations of such clauses and/or features taken from the description, during prosecution of the present application or of any further application derived therefrom.

Clause 1: A first network node (100; 200) comprising
  a key storage (110; 160; 210; 260) arranged to store at least local key material (216, 218; 217) to protect integrity of the communication between the first network node and other network nodes, the local key material to protect integrity being generated by a trusted third party (TTP) for integrity (194; 296, 298; 297) using a local key material generation algorithm of an identity-based key predistribution scheme for a second identity of the first network node,
  a communication interface (120; 170; 220; 265) arranged for digital communication between the first network node and the other network nodes, and a processor circuit (130) configured to,
  obtain a further identity, e.g., different from the first and second identity of the second network node,
  compute a third key (247) to protect integrity from the further identity and at least the local key material to protect integrity of the first network node,
  compute a second message authentication code over at least the message using the third key,
  send the second message authentication code, e.g., to the second network node.

Clause 2. A first network node as in Clause 1 wherein the processor circuit (130) is configured to,
  obtain a second identity of a second network node (150; 201),
  compute a second shared key (246) to protect integrity from the second identity of the second network node and the local key material to protect integrity of the first network node,
  compute a first message authentication code over the message using the second shared key, and
  send the message, and the first message authentication code to the second network node, The first network node according to clauses 1 or 2 may be combined with anyone of claims 3-7. Moreover, the first network node could be extended with local key material from a TTP for confidentiality to encrypt messages.

Figure 5:
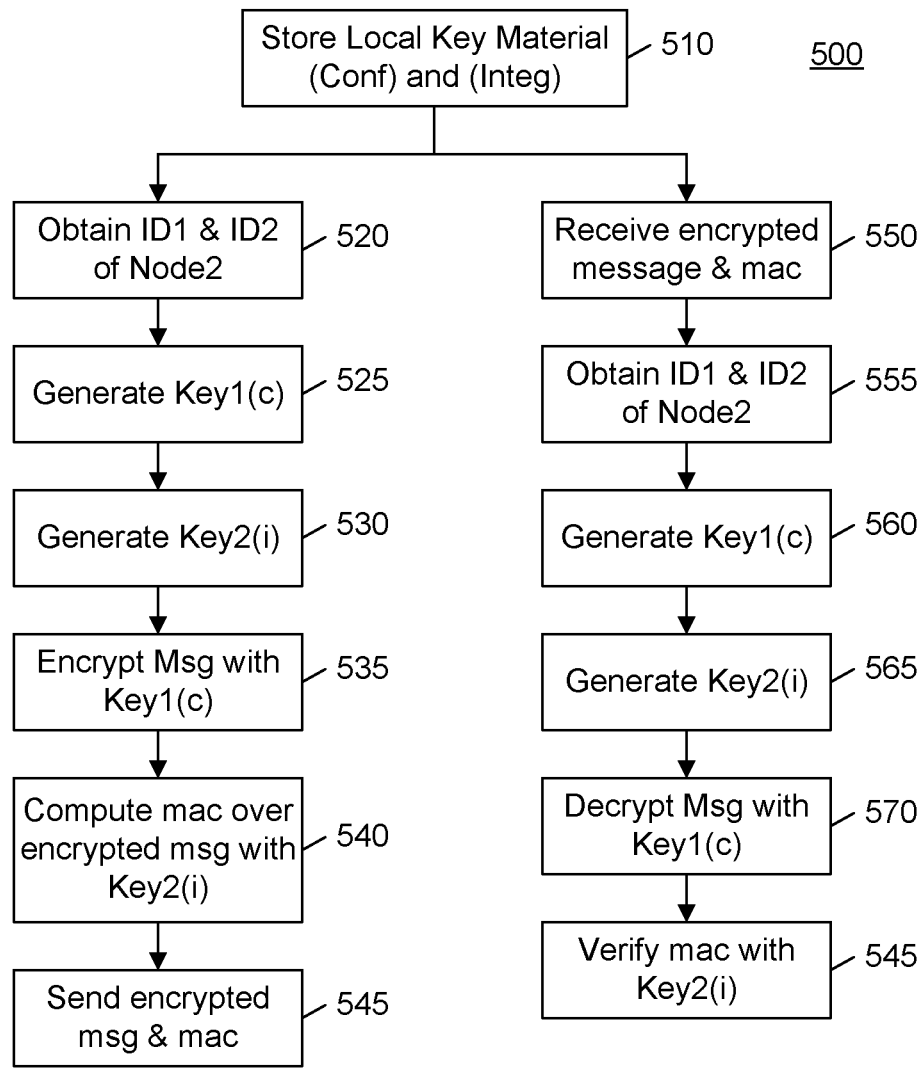
Figure 6:
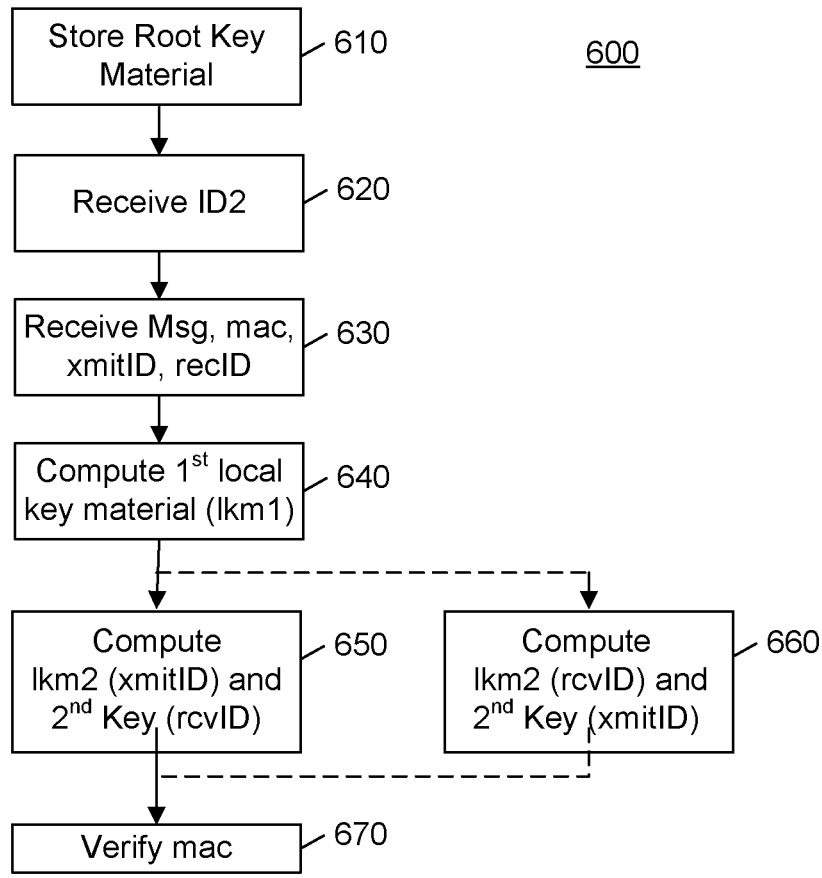

FIG. 5 schematically shows an example of an embodiment of an electronic communication method 500 for a first network node, such as first network node 100, 200, 202.
  The method comprises
  storing 510 at least
    local key material (212, 214; 213) to protect confidentiality of communication between the first network node and other network nodes, the local key material to protect communication being generated by a trusted third party (TTP) for confidentiality (192; 292, 294; 293) using a local key material generation algorithm of an identity-based key predistribution scheme for a first identity of the first network node, and
    local key material (216, 218; 217) to protect integrity of the communication between the first network node and other network nodes, the local key material to protect integrity being generated by a trusted third party (TTP) for integrity (194; 296, 298; 297) using a local key material generation algorithm of an identity-based key predistribution scheme for a second identity of the first network node,
  Method 500 further comprises
  obtaining 520 a first and second identity of a second network node (150; 201),
  computing 525 a first shared key (245) to protect confidentiality from the first identity of the second network node and the local key material to protect confidentiality of the first network node,
  computing 530 a second shared key (246) to protect integrity from the second identity of the second network node and the local key material to protect integrity of the first network node,
  encrypting 535 a message using the first shared key
  computing 540 a first message authentication code over the message using the second shared key, and
  sending 545 the encrypted message, and the first message authentication code to the second network node.
  Method 500 may also or instead comprise
  receiving 550 an encrypted message, and a first message authentication code from a second network node,
  obtaining 555 a first and second identity of a second network node,
  computing 560 a first shared key (245) to protect confidentiality from the first identity of the second network node and the local key material to protect confidentiality of the first network node,
  computing 565 a second shared key (246) to protect integrity from the second identity of the second network node and the local key material to protect integrity of the first network node,
  decrypting 570 the encrypted message using the first shared key
  verifying 575 the first message authentication code using the second shared key, FIG. 6 schematically shows an example of an embodiment of an electronic trusted third party (TTP) method for integrity 600. Method 600 comprises
  storing 610 root key material,
  receiving 620 a second identity,
  receiving 630 a message, a message authentication code, a sending second identity, and a receiving second identity
  computing 640 first local key material to protect integrity by applying a local key material generation algorithm of an identity-based key predistribution scheme to the second identity and the root key material,
  computing 650 second local key material to protect integrity by applying the local key material generation algorithm of the identity-based key predistribution scheme to the root key material and the sending second identity, computing a second shared key from the second local key material to protect integrity and the receiving second identity. Instead of stage 650, the method may also perform a stage of computing 660 second local key material to protect integrity by applying the local key material generation algorithm of the identity-based key predistribution scheme to the root key material and the receiving second identity and computing a second shared key from the second local key material to protect integrity and the sending second identity, and
  verifying 670 the message authentication code over the message using the third key.

Below additional embodiments are described. TTPs for confidentiality are also referred herein as a body TTP, or a bTTP. TTPs for integrity are also referred herein as a MAC TTP, or a mTTP. Some of the embodiments have one or more of the following aspects:
  using at least 1 additional TTP for the MAC over the message that is not used for the body of the message so that it is possible to control whether a message can only be intercepted (encryption/confidentiality) or spoofed (authentication), and
    including in the message a sub-message addressed to a third-party identity that is at least managed by this additional TTP, this message including the MAC over the message body. The key material of this third-party is preferably not distributed by the additional TTP to any party outside the additional TTP. As an option, it may even be a random identity selected by the sender, e.g., taken from a very large space.
  providing only the key materials from the body-of-the-message TTPs to lawful intercept officers
  verifying that the message was sent by the sender, and not the receiver, by decrypting the sub-message addressed to the third-party identity, and checking that the MAC matches the body of the message. This can be done using the key material of the sender, or of the (randomly selected) third party identity.

duplicating root key material between jurisdictions that require intercept capabilities, and for a party A in jurisdiction 1 that wants to communicate to B in jurisdiction 2, to use only body of message TTPs that are shared between jurisdiction 1 and 2.

Some of the embodiments provide one or more of the following effects:

(a) both sender and receiver can encrypt and decrypt both message and MAC using the local key material (KM) of the message and MAC TTPs.

(b) Lawful intercept is possible if the message TTPs agree to provide the relevant key material, while spoofing by lawful interceptors is not possible as long as they have no access to the key materials of the MAC TTPs.

(c) If the root key material of a TTP is shared between 2 (or more) jurisdictions, these jurisdictions can independently decide to intercept messages that are fully protected by Key Material derived from these TTPs.

(d) Using information from the MAC TTP or the selected third party, one can check whether the receiver spoofs receiving a message by decrypting the MAC sent to the third-party identity—the receiver will not have key material enabling it to generate the proper key for that.

Below is a first example, how this may be used in practice:

1. In the operational phase, senders and receivers communicate as normal. They use the MAC to verify integrity of the messages.

2. If a lawful intercept for a party A is required, the message TTPs would provide, e.g., the local key material of party A, KM_A, to the intercepting party. As long as one TTP refuses to share its KM_A, no interception can take place this implies automatically that checks & balances are improved. The MAC TTPs do not need to share any information for intercept to take place.

3. If a message sent by A is used as evidence in court, it can be proven that the message has not been spoofed.

a. The intercepting party cannot spoof messages from/to A, as it does not get access to the key material from the MAC TTP, therefore the intercepting party can read & write the message body, but the intercepting party cannot verify or meaningfully write the MAC.

b. Also, Party B cannot spoof received messages from A, as it does not have the MAC key material from the randomly selected third party identity.

c. A court can verify that the messages were not spoofed, e.g., by also retrieving local key material from the MAC TTP. Alternatively, the MAC TTP or the selected third party identity can decrypt and/or verify the message sent to the third-party identity.

Below a more detailed embodiment is disclosed. The system comprises the following four different types of entities:

1. Clients C: devices sending and receiving messages to/from each other.

2. Body Trusted Third parties bTTP: one or more servers that act as the root(s) of trust used to secure body of the messages between clients 3. MAC Trusted Third parties mTTP: one or more servers that act as the root(s) of trust used to secure the MAC between parties.

4. Law enforcement L: one or more parties that have a legal right to decrypt messages from/to a client.

Optionally, a TTP first needs to enroll with L to get permission to issue key materials to clients.

During a registration phase, a Client C_a may configure itself by retrieving body key materials bKM_a_i from all body trusted third parties bTTPi. Client C_a similarly retrieves MAC key materials mKM_a_i from all mTTPi. Obtaining this key material may use the system described in the EP patent filing of the same applicant, "System and method for distribution of identity based key material and certificate", EP16162597, filing date 2016 Mar. 29, included herein by reference, e.g., securely retrieving key material by including a public key or hash thereof in the request, e.g., using a system according to claim 1 thereof.

During an operational phase the following stages may be performed:

Client C_a calculates three keys to communicate with client C_c:

The body-key bK=SUM of all bKM_a_i(c).

The MAC-key mK=SUM of all mKM_a_i(c)+bK. Note that + is performed according to the specification of the key predistribution scheme. Alternatively, key material could also be combined in a different way, e.g. by means of xoring or a key derivation function.

The sender-key sK (optional)

Pick a third-party identity t (Random or pre-assigned)

sK=SUM of all bKM_a_i(t)+SUM of all mKM_a_i(t)

Client C_a computes the MAC over the body with mK

Client C_a encrypts the body of the message to C_c and C_a with bK: enc_body|m_MAC (where "|" denotes concatenation)

Client C_a computes (optional) the MAC over enc_body|m_MAC with sK: s_MAC. Note that as an option, the further identity t used to compute sK can be taken to be the hash of enc_body+m_MAC eliminating the need to transmit additional information and implicitly linking the information.

Further option is to select this t from a range of addresses that are never handed out by the MAC TTPs Alternative options for t are a fixed t, or a t that client A trusts to keep its KM secure (e.g. a Notary)

Client C_a sends message [enc_body, m_MAC, {t}, s_MAC] to C_b. The latter two parameters are optional. Here {t} indicates that this is an optional parameter if it is computed as the hash of enc_body+m_MAC, or if it is fixed in the protocol.

Client C_c calculates two keys:

The body-key bK=SUM of all bKM_c_i(a).

The MAC-key mK=SUM of all mKM_c_i(a)+bK.

Uses key reconciliation if needed

C_c can now decrypt enc_body and m_MAC using bK, and verify the m_MAC using mK.

C_c ignores t, s_MAC.

For lawful intercept, we distinguish between confidentiality and integrity

In case of lawful intercept (confidentiality): In this use case, law allows for the interception but no modification of messages.

L retrieves bKM_a_i from all bTTPi, if L has the right to decrypt messages from C_a.

Alternatively, if L is only interested in the communication between C_a and C_b, L only retrieves the corresponding keys generated from bKM_a_i Upon receiving a message between C_a and C_c, L now calculates one key The body-key bK=SUM of all bKM_a_i(c).

L can decrypt enc_body using bK.

Lawful intercept (integrity):

In this use case, law allows for the interception and verification (and possibly even modification) of messages.

L retrieves bKM_a_i from all bTTPi and mKM_a_i from all mTTPi, if L has the right to decrypt and modify messages from C_a.
    Alternatively, if L is only interested in the communication between C_a and C_b, L only retrieves the corresponding keys for that communication link. Note that this does not allow generating sK.
Upon receiving a message between C_a and C_c, L now calculates one key
    The body-key bK=SUM of all bKM_a_i(c).
    The mac-key mK
L can decrypt enc_body using bK. L can also create any messages and inject them in the communication link.
To verify the message source, e.g., prove that a message [enc_body, m_MAC, t, s_MAC] was sent by C_a to C_c (and not vice-versa). The following may be done:
    Calculate sK'=SUM of all bKM_t_i(a)+SUM of all mKM_t_i(a)
    L can obtain sK from sK' and reconciliation data.
    Verify s_MAC' from enc_body+m_MAC and compare it with the received s_MAC.

In the various embodiments, the input interface may be selected from various alternatives. For example, input interface may be a network interface to a local or wide area network, e.g., the Internet, a storage interface to internal or external data storage, a keyboard, etc.

Typically, the devices 200, 201, 202, and 400 each comprise a microprocessor (not separately shown in FIGS. 1a-1c, and 3) which executes appropriate software stored at the devices; for example, that software may have been downloaded and/or stored in a corresponding memory, e.g., a volatile memory such as RAM or a non-volatile memory such as Flash (not separately shown). Alternatively, the devices 200, 201, 202, and 400 may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, device 200 may comprise a key storage circuit, a communication interface circuit, an identity obtainer circuit, a combiner circuit, a shared key circuit, an encryption circuit, a mac generation circuit. Embodiments may further comprise a further identity obtainer circuit. Device 201 may comprise the appropriate circuits from device 200 adapted as required and a decryption circuit, a mac verification circuit. TTP 400 may comprise a key storage circuit, a first communication interface circuit, a second communication interface circuit, a local key material generator circuit, and a mac verification unit circuit.

The circuits implement the corresponding units described herein. The circuits may be a processor circuit and storage circuit, the processor circuit executing instructions represented electronically in the storage circuits. The circuits may also be, FPGA, ASIC or the like.

Many different ways of executing the method according to an embodiment are possible, as will be apparent to a person skilled in the art; including methods 500 and 600. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform a method according to an embodiment, such as method 500 or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
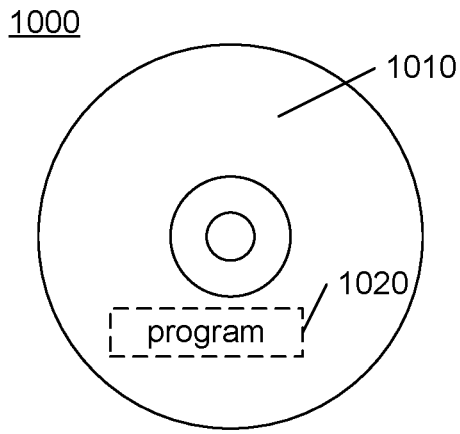

FIG. 7a shows a computer readable medium 1000 having a writable part 1010 comprising a computer program 1020, the computer program 1020 comprising instructions for causing a processor system to perform a communication method or TTP method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a communication method or TTP method.

Figure 7B:
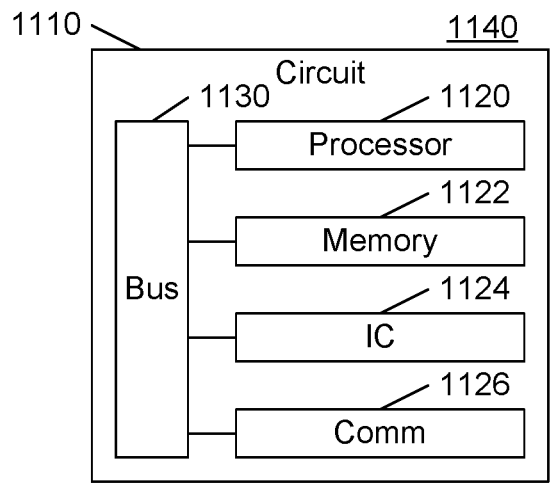

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the first network node or TTP device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A first network node comprising:
   a key storage arranged to store at least:
      first local key material, and
      second local key material;
   a communication interface, wherein the communication interface is arranged for digital communication between the first network node and other network nodes; and
   a processor circuit configured to:
      obtain a first identity of a second network node and a second identity of the second network node,
      compute a first shared key based on the first identity and the first local key material,
         wherein the first shared key is arranged to protect confidentiality of the first network node,
      compute a second shared key based on the second identity and the second local key material,
         wherein the second shared key is arranged to protect integrity of the first network node,
      encrypt a message using the first shared key to form an encrypted message,
      compute a first message authentication code over the encrypted message using the second shared key,
      obtain a third identity different from the first identity and the second identity of the second network node,
      compute a third key to protect integrity, based on the third identity, and at least the local key material,
         wherein the third key is arranged to protect integrity of the first network node,
      compute a second message authentication code over at least the message using the third key,
      send the encrypted message and the first message authentication code to the second network node, and
      send the second message authentication code to at least one of: the second network node, or another node;
   wherein the first shared key, the second shared key, and the third key differ from each other.

2. The first network node of claim 1, wherein the processor circuit is configured to send the third identity to the second network node.

3. The first network node of claim 1, wherein the processor circuit is configured not to send the third identity to the second network node.

4. The first network node of claim 1, wherein the second message authentication code is computed over at least the message and the first message authentication code.

5. The first network node of claim 1, wherein the processor circuit is configured to
   combine the first local key material and the second local key material forming a combined local key material, wherein the third key is derived from the third identity and the combined local key material.

6. The first network node of claim 1, wherein the processor circuit is configured to compute the third key by:
   obtaining an intermediate third key,
      wherein the intermediate third key is based on the third identity and the second local key material,
      wherein the intermediate third key is arranged to protect integrity of the first network node, and
   combining the intermediate third key with the first shared key.

7. The first network node of claim 1, wherein the first identity and the second identity are equal.

8. The first network node of claim 1, wherein the processor circuit is configured to randomly select the third identity.

9. The first network node of claim 1, wherein the processor circuit is configured to obtain the third identity as a fixed identity.

10. The first network node of claim 1, wherein the processor circuit is configured to obtain the third identity by applying a hash function to the message.

11. The first network node of claim 1, wherein the processor circuit is configured to:
   receive a further encrypted message, and a further message authentication code from the second network node,
   decrypt the further encrypted message using the first shared key, and
   verify the further message authentication code using the second shared key.

12. An electronic communication method for a first network node comprising:
   storing at least:
      first local key material and
      second local key material
   obtaining a first identity of a second network node and a second identity of the second network node,
   computing a first shared key from the first identity and the first local key material,
      wherein the first shared key is arranged to protect confidentiality of the first network node,
   computing a second shared key from the second identity and the second local key material,
      wherein the second shared key is arranged to protect integrity of the first network node,
   encrypting a message using the first shared key,
   computing a first message authentication code over the message using the second shared key,
   obtaining a third identity different from the first identity and the second identity, computing a third key to protect integrity from the third identity and at least the local key material to protect integrity of the first network node,
computing a second message authentication code over at least the message using the third key,
sending the encrypted message, and the first message authentication code to the second network node, and
sending the second message authentication code to at least one of the second node or another node;
wherein the first shared key, the second shared key, and the third key differ from each other.

13. The method of claim 12, further comprising:
receiving a further encrypted message, and a further message authentication code from a second network node,
decrypting the further encrypted message using the first shared key
verifying the further message authentication code using the second shared key.

14. A non-transitory computer-readable medium comprising a program that, when executed by a processor, causes the processor to:
obtain a first identity of a second network node and a second identity of the second network node,
compute a first shared key from a first identity and first local key material,
wherein the first shared key is arranged to protect confidentiality of the first network node,
compute a second shared key from the second identity and the second local key material,
wherein the second shared key is arranged to protect integrity of the first network node,
encrypt a message using the first shared key,
compute a first message authentication code over the message using the second shared key, and
obtain a third identity different from the first identity and the second identity of the second network node,
compute a third key to protect integrity from the third identity and at least the local key material to protect integrity of the first network node,
compute a second message authentication code over at least the message using the third key,
send the encrypted message and the first message authentication code to the second network node, and
send the second message authentication code to at least one of the second node or another node;
wherein the first shared key, the second shared key, and the third key differ from each other.

15. The medium of claim 14, wherein the first identity and the second identity are equal.

16. The medium of claim 14, wherein the program causes the processor to generate a random number as the third identity.

17. The medium of claim 14, wherein the program causes the processor to compute the third key by:
obtaining an intermediate third key,
wherein the intermediate third key is based on the third identity and the second local key material,
wherein the intermediate third key is arranged to protect integrity of the first network node, and
combining the intermediate third key with the first shared key.

18. The medium of claim 14, wherein the program causes the processor to obtain the third identity as a fixed identity.

19. The medium of claim 14, wherein the program causes the processor to obtain the third identity by applying a hash function to the message.

* * * * *